ARDASHUS A. AYKANIAN
EDGAR E. HARDY INVENTORS.

BY
ATTORNEY.

ARDASHUS A. AYKANIAN
EDGAR E. HARDY
INVENTOR

United States Patent Office 3,658,973
Patented Apr. 25, 1972

---

3,658,973
METHOD FOR EXTRUDING A FOAMED THERMOPLASTIC POLYMER
Ardashus A. Aykanian, Wilbraham, Mass., assignor to Monsanto Company, St. Louis, Mo.
Continuation of application Ser. No. 835,880, June 9, 1969, which is a continuation of application Ser. No. 563,404, July 7, 1966, which is a division of application Ser. No. 502,797, Sept. 27, 1965, which is a continuation of application Ser. No. 342,679, Feb. 5, 1964, now Patent No. 3,451,103, which in turn is a division of application Ser. No. 114,352, June 2, 1961. This application Mar. 22, 1971, Ser. No. 128,621
Int. Cl. B29d 7/02, 27/00
U.S. Cl. 264—53                                  7 Claims

---

ABSTRACT OF THE DISCLOSURE

Extruding a foamed thermoplastic resin wherein a volatile organic blowing agent is introduced into a molten thermoplastic polymer in a zone of decompression in a screw extruder. Thereafter, prior to extrusion the pressure is increased and the molten polymer further mixed with the blowing agent. The mix is then cooled, and finally the pressure on the mix is increased while continuing the cooling. The mix is then extruded into a zone of low pressure. Polystyrene may be used as the thermoplastic polymer.

---

This application is a copending continuation of application Ser. No. 835,880 filed June 9, 1969 and now abandoned which is a copending continuation of application Ser. No. 563,404, filed July 7, 1966 which application is a copending divisional of application Ser. No. 502,797, filed Sept. 27, 1965, and now abandoned. Application Ser. No. 502,797 is a copending continuation of application Ser. No. 342,679, filed Feb. 5, 1964, and now Pat. No. 3,451,103. Application Ser. No. 342,679 is a copending divisional of application Ser. No. 114,352, filed June 2, 1961, and now abandoned.

This invention relates to a method for incorporating liquid substances into thermoplastic resins. In particular, the invention is concerned with a method for simultaneously incorporating a normally liquid foaming agent in a thermoplastic resin and extruding the resulting foamable resin composition.

Most thermoplastic resins, before being fabricated into their ultimately used form, are compounded with other materials such as plasticizers, pigments, antioxidants, flame-retarding agents, foaming agents and the like. In preparing such resin composition, it is common practice to admix the components and then pass them through an extruder in which the resin is melted and the other components are uniformly dispersed throughout the melted resin. This method is not well adapted for incorporating liquid substances into thermoplastic resins as liquids tend to interfere with the efficient feeding of the resin particles into the extruder.

It has been proposed that the aforementioned difficulties be overcome by injecting liquid substances into the melted thermoplastic resin within the extruder. This proposal has not achieved wide success for at least two reasons. First, the liquid substance that is injected into the melted thermoplastic resin tends not to be uniformly dispersed therethrough. Second, the melted thermoplastic resin tends to plug the openings through which the liquid substance is injected into the extruder.

It is an object of this invention to provide an improved method for injecting liquid substances into a melted thermoplastic resin within an extruder.

Another object of the invention is to provide an improved method for injecting a volatile liquid foaming agent into a melted thermopastic resin within an extruder.

A further object of the invention is to provide an improved method for extruding foamed thermoplastic resins and particularly foamed styrene polymers in which the thermoplastic resin is fed to an extruder and a volatile liquid foaming agent is injected into the melted resin within the extruder.

Other objects and advantages of this invention will be apparent from the following detailed description thereof when read in conjunction with the attached drawings in which.

The apparatus utilized by this invention consists of a combination of an extruder and an injection means capable of injecting a liquid substance into a melted thermoplastic resin within the extruder at a high pressure. The injection means employed are so constructed as to prevent the flow of melted resin into the orifice through which the liquid is injected into the resin.

The attached drawings illustrate an embodiment of the invention in which a liquid foaming agent is injected into a melted resin and the resulting composition is extruded as a blown foamed resin film.

Figure 1:
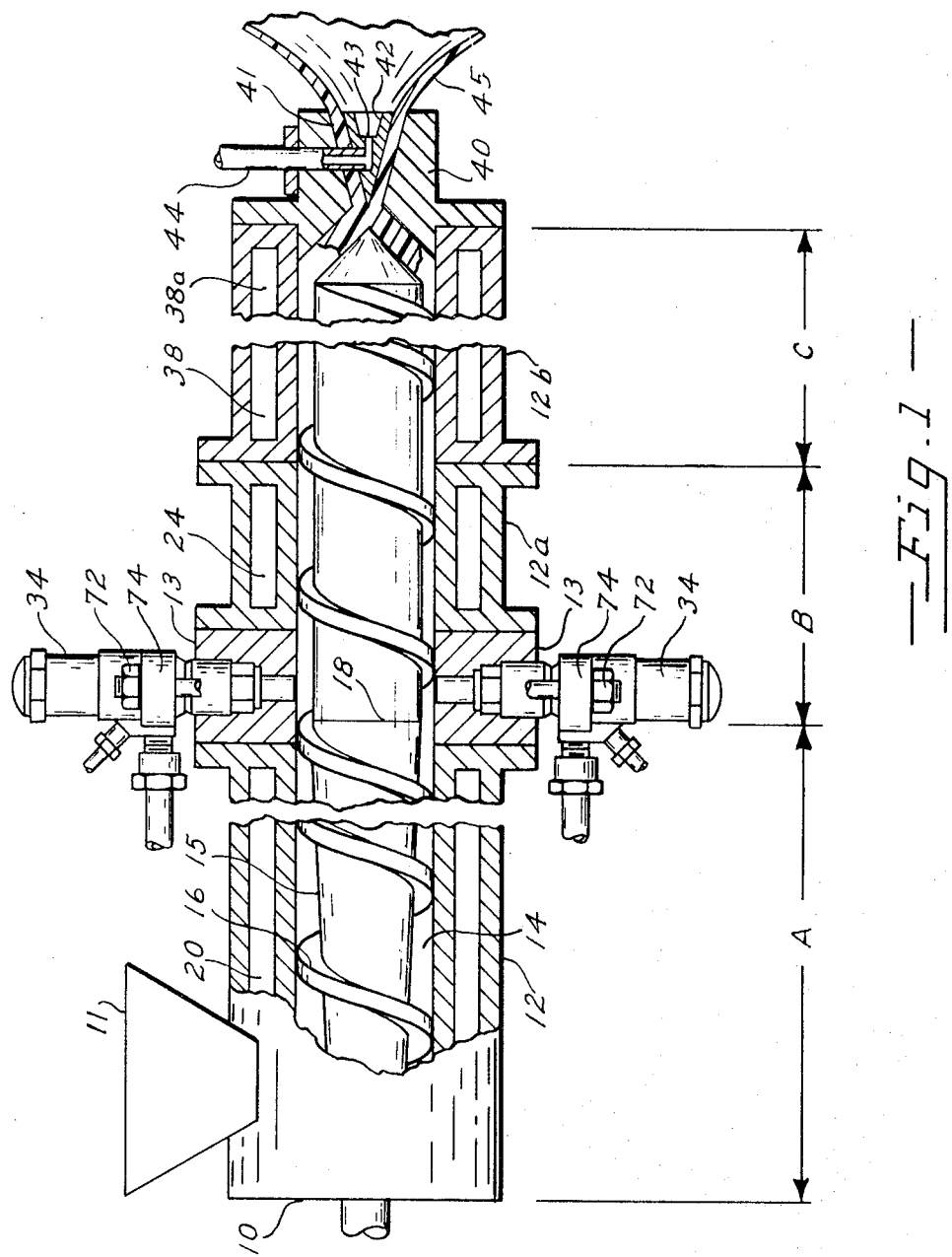
FIG. 1 is a side elevation, partially in section, of one embodiment of the invention.

Referring to FIG. 1, the apparatus consists of an extruder 10 which includes a feed hopper 11, a barrel which consists of sections 12, 12a and 12b, which are held together by bolts not shown, a cylindrical chamber 14 provided in the barrel, and a screw 15. As illustrated, extruder 10 is divided into three functional zones, viz., a plasticating zone designed as A, an injection zone designated as B and a diffusion and cooling zone designated as C.

In Zone A, barrel section 12 includes a chamber 20 through which heat transfer fluid can be circulated by means not shown. Screw 15 is provided with helical land 16 and, as viewed from left to right, has a root which uniformly increases in diameter until reaching a maximum at 18.

Figure 2:
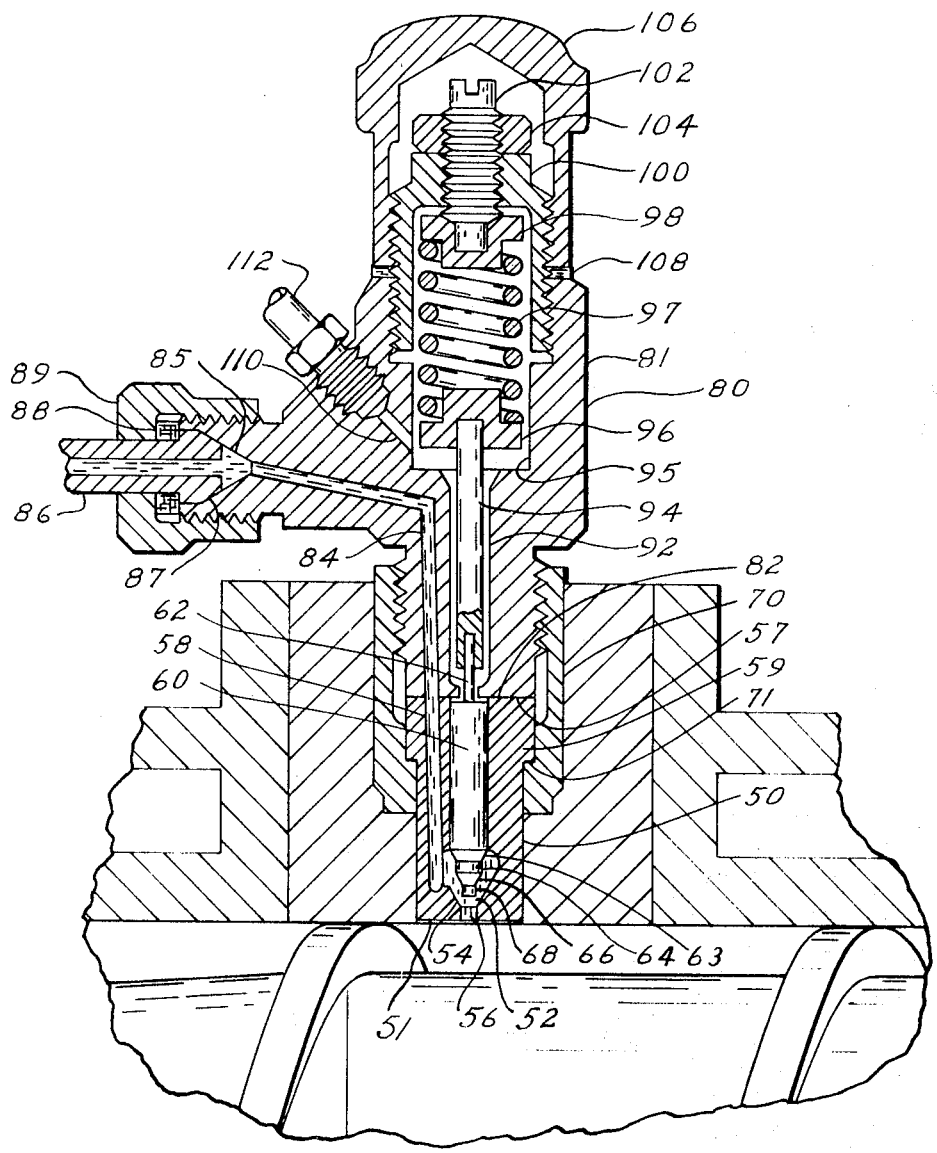
FIG. 2 is an enlarged view, partially in section, of the liquid injection means illustrated in FIG. 1.

In Zone B, screw 15 has a constant root diameter. A series of liquid injectors 34—34 are radially disposed about barrel section 12b and mounted in inserts 13—13 provided therein. The detailed construction of liquid injectors 34—34 is illustrated in FIG. 2 and will be subsequently described. Also included in Zone B is a chamber 24 through which heat transfer fluid can be circulated by means not shown.

In Zone C, screw 15 is shown as having a constant root diameter. In actual practice it is preferred that the root diameter of screw 15 in the fore section of Zone C (i.e., adjacent to Zone B) be slightly larger than the root diameter in Zone B and then decrease in diameter in the aft section of Zone C. Barrel section 12b is provided with two separate chambers 38 and 38a through which separate heat transfer fluids can be circulated by means not shown.

A blow film die 40 of conventional construction is attached to the delivery end of barrel section 12b by fastening means not shown. Die 40 includes an annular passage 41 and a centrally located mandrel 42 which contains an air passage 43. A blow pipe 44 is provided to deliver air to passage 43.

As illustrated in FIGS. 1 and 2, each of liquid injectors 34—34 consists of a nozzle 50 and a nozzle holder 80 which are held in proper functional relationship by a cap nut 70. Cap nut 70 is securely seated into a recess provided in insert 13 of barrel section 12b by means of bolts 72—72 which extend through threaded taps provided in collar 74. Suitable gaskets (not shown) are inserted in the recesses included in inserts 13 to provide a fluid tight seal. Nozzle 50 is supported in cap nut 70 by a shoulder 59 which rests upon an internal seat 71. Body member 81 of nozzle holder 80 is threadedly mounted in cap nut 70 so that its face 82 urges nozzle 50 into its seated position. Face 82 of body member 81 and face 57 of nozzle 50 are machined to close tolerances so that no gasket is required therebetween.

Nozzle 50 includes a face 51 (which functions as an integral part of the wall of chamber 14) and a liquid chamber 52 which terminates in a valve seat 54. A discharge orifice 56 provides communication between chamber 52 of nozzle 50 and chamber 14 of the extruder. A liquid passage 58 is included in nozzle 50 to deliver liquid to chamber 52.

A valve (shown in an open position) is fitted into chamber 52 and includes a body section 60, a stem 62, a frustoconical face 63, a cylindrical extension 64, a frustoconical valve face 66 and a cylindrical pin 68. Body section 60 is machined to a close tolerance so that it can slide within and yet seal the upper section of chamber 52. Similarly, valve face 66 is machined to a close tolerance so that the lower section of chamber 52 is sealed when valve 60 is dropped into its closed position.

Nozzle holder 80 consists of a body member 81, a spring compression cap 100 and a bonnet 106. Body member 81 includes a liquid passage 84 which communicates with liquid passage 58 of nozzle 50 and terminates in a seat 85. Also communicating with liquid passage 84 is a high pressure fluid line 86 which terminates in a frustoconical face 87. Face 87 is urged into sealed relationship with seat 85 by means of a washer 88 and a threaded cap 89. Body member 81 also contains a central cylindrical channel 92 in which a spindle 94 is slideably mounted. A cylindrical recess provided in the bottom of spindle 94 engages valve stem 62 while the top of spindle 94 fits into a cylindrical recess included in the bottom of spring retainer 96. Body member 81 also contains a larger cylindrical channel 95 which communicates with channel 92. A first spring retainer 96, a spring 97 and a second spring retainer 98 are seated in chamber 95. A threaded spring compression cap 100 is screwed into threads provided in the upper internal wall of chamber 95 and compresses spring 97. An adjusting screws 102 is mounted in a threaded tap provided in the top of cap 100 and is used to regulate the compressive force applied to spring 97. A lock nut 104 securely maintains the desired setting of screw 102. A bonnet 106 is threadably mounted upon and covers spring compression cap 100. A gasket 108 is included between the bottom face of bonnet 106 and the top face of body member 81 to provide a fluid tight seal for chamber 95. A liquid passage 110 is provided in body member 81 and communicates with chamber 95. A line 112 is screwed into the end of liquid passage 110 and bleeds off any liquid which flows into chamber 95.

In the operation of the embodiment illustrated in FIGS. 1 and 2, thermoplastic resin particles are fed from hopper 11 directly into chamber 14. To maintain clarity of illustration, however, the resin is not shown in chamber 14 until it passes the tip of screw 15. The resin particles are advanced through Zone A by land 16. As the resin is advanced through chamber 14 it is melted (by means of both the heat transfer fluid circulated through chamber 20 and the frictional heat generated through the chamber) and is placed under substantial pressure as the volume of chamber 14 decreases as the root diameter of screw 15 increases. The resin temperature and pressure in Zone A reach a maximum as the resin passes 18.

In Zone B, a liquid foaming agent such as pentane enters chamber 14 through orifices 56—56 of liquid injectors 34—34 and is rapidly and homogeneously dispersed throughout the melted resin. The detailed operation of the liquid injectors 34—34 will be subsequently described.

The melted resin as it enters Zone C is at a high temperature and has a liquid foaming agent homogeneously dispersed therethrough. To further assure uniform diffusion of the foaming agent throughout the melted resin the resin heated in the fore section of Zone C by circulating a heated fluid through chamber 38. As the resin is advanced through the aft section of Zone C, its temperature is lowered by circulating a coolant through chamber 38a. In addition, the pressure on the resin in Zone C is increased due to the restrictive action of the die.

After leaving Zone C, the melted resin enters die 40 and is extruded through passage 41 as a seamless tube 45. The tube 45 is delivered to downstream pinch rolls (not shown) and air is blown into the pinched tube 45 through line 44 to expand tube 45 into a large bubble.

The method of introducing foaming agent into the melted resin is illustrated in FIG. 2. A foaming agent such as pentane is fed into line 86 (by a pump not shown) at a pressure higher than the pressure on the resin in Zone B. The foaming agent then passes through liquid passage 84, liquid passage 58 and enters liquid chamber 52. The foaming agent exerts pressure on the frustoconical face 63 of valve body 60 and urges the valve into the open position shown in FIG. 2. The foaming agent then passes through orifice 56 and enters chamber 14 of the extruder.

To stop the flow of foaming agent into chamber 14 it is only necessary to reduce the pressure on the foaming agent to below the preset compressive force of spring 97. The spring 97 acting through spring retainer 96 and spindle 94, urges valve body 60 into its closed position. In its closed position, the frustoconical valve face 66 seals itself against valve seat 54 and cylindrical pin 68 rests in orifice 56. In practice, the foaming agent can be fed conveniently into the liquid injector 34 by means of a piston driven pump in which the pressure oscillates between 0 and its maximum value. The compressive force of spring 97 is set well above the resin pressure in Zone B so that orifice 56 is sealed at all times except when the liquid foaming agent is flowing into chamber 14. This action prevents the resin from flowing into chamber 52 and plugging the liquid injecting means.

From the paragraph above it will be seen that, in the preferred embodiment of the invention, the liquid foaming agent is not injected into the melted resin in a steady stream, but rather in intermittent or pulsating surges. In addition, the pressure differential forcing the liquid foaming agent into the melted resin will vary as the valve is alternately opening and closing. The net effect of this action will be to inject the liquid foaming agent to different depths in different sections of the melted resin. As the liquid foaming agent from any individual site tends to diffuse equally in all directions, this injection pattern tends to assist in attaining a uniform distribution of the liquid foaming agent throughout the melted resin.

Figure 3:
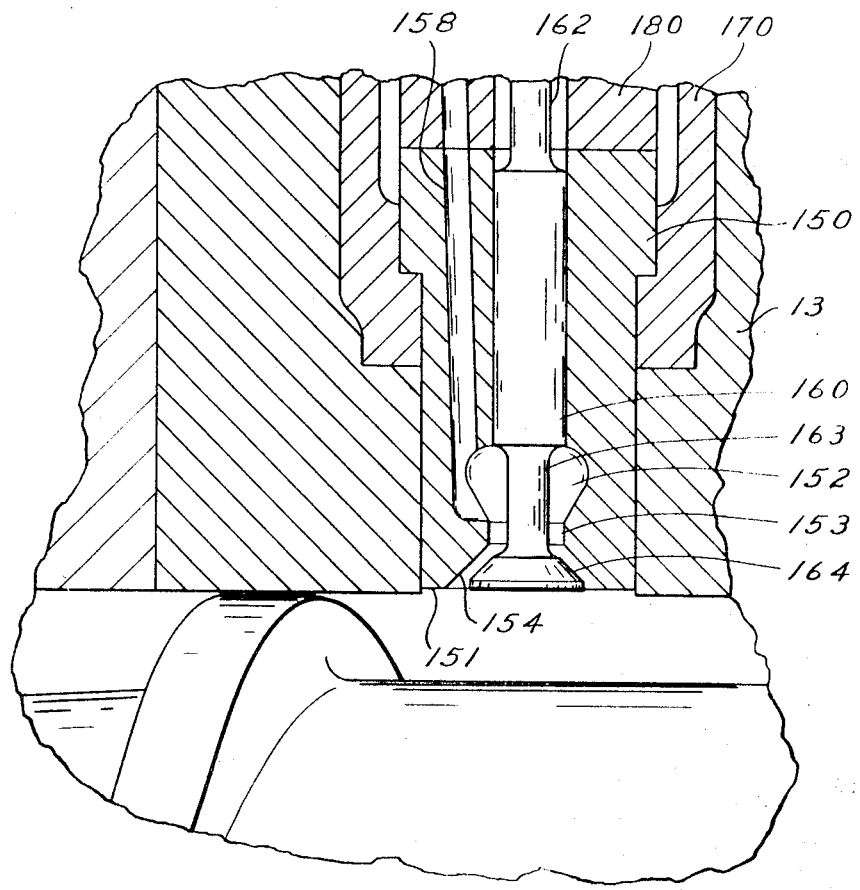
FIG. 3 is in view, partially in section, of a modified nozzle that can be employed in liquid injection means of the general type illustrated in FIG. 2.

FIG. 3 illustrates a modified version of a nozzle that can be employed in the liquid injection means 34 illustrated in FIG. 2. Nozzle 150 includes a face 151 (which functions as an integral part of the wall of the extruder), a liquid chamber 152, an orifice 153 which provides communication between chamber 152 of nozzle 150 and the chamber of thhe extruder, and a frustoconical valve seat 154. A liquid passage 158 is included in nozzle 150 to deliver fluid to chamber 152.

A valve (shown in open position) is slideably mounted in nozzle 150 and seals the upper section of chamber 152. The valve includes a body section 160, a stem 162, a cylindrical extension 163 and a frustoconical valve face 164 which is attached to the end of cylindrical extension 163. Valve face 164 and valve seat 154 are machined to close tolerances so that the nozzle is sealed when valve 160 is raised into its closed position. Valve stem 162 is operatively attached to a spring in a manner analogous to that illustrated in FIG. 2 except that the spring is under tension to urge valve face 164 into seated engagement with valve seat 154.

In operation, the valve is normally held in a closed position by the tension of the spring. A foaming agent such as pentane is fed into liquid chamber 152 through line 158. The liquid in chamber 152 bears upon valve face 164 and forces the valve into the opened position shown when the liquid pressure in chamber 152 exceeds the preset pressure of the spring. To stop the flow of the foaming agent into chamber 14, it is only necessary to reduce the pressure of the foaming agent in chamber 152 to below the preset tension force of the spring.

Figure 4:
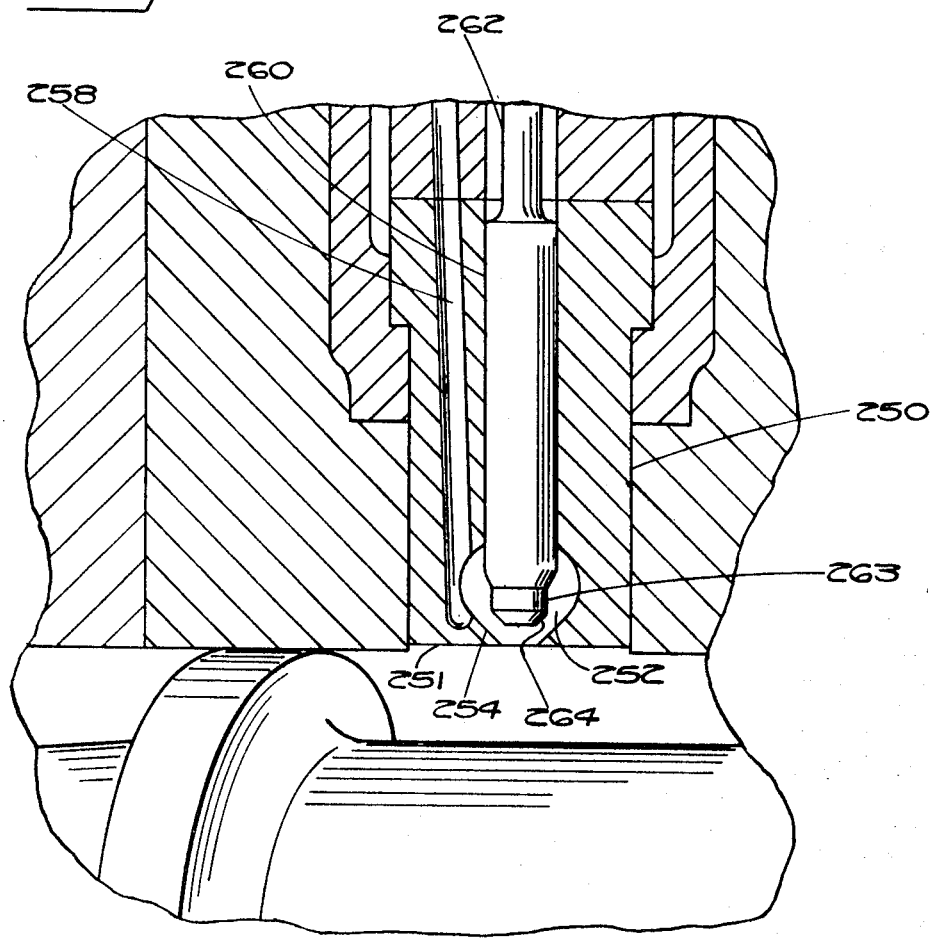
FIG. 4 is a view, partially in section, of another modified nozzle which can be employed in liquid injection means of the general type illustrated in FIG. 2.

FIG. 4 illustrates still another modified version of a nozzle that can be employed in the injection means 34 illustrated in FIG. 2.

Nozzle 250 includes a face 251 (which functions as an integral part of the wall of chamber 14) and a liquid chamber 252 which terminates in a valve seat 254. A liquid passage 258 is included in nozzle 250 to deliver liquid to chamber 252.

A reciprocally mounted valve (shown in an open position) is fitted into chamber 252 and includes a body section 260, a stem 262, a cylindrical extension 263, and a frustroconical face 264. Body section 260 is machined to a close tolerance so that it can slide within and yet seal the upper section of chamber 252. Similarly, valve face 264 is machined to a close tolerance so that chamber 252 is sealed from the extrusion when valve 260 is dropped into its closed position. The nozzle illustrated in this embodiment functions in essentially the same manner as that shown in FIG. 2, but being somewhat less involved structuarlly, is more economically fabricated.

The following examples are set forth to illustrate more clearly the principle and practice of this invention to those skilled in the art.

EXAMPLE I

A blown film of foamed polystyrene is prepared employing an apparatus of the type illustrated in FIG. 1. Chamber 14 is 2.5" in diameter and has an overall length of 120". Zone A is 50" long, Zone B is 28" long and Zone C is 42" long. Land 16 has a constant pitch throughout its entire length.

In Zone A, the first 7.5 L/D section of screw 15 has a root diameter of 1.76", the second 5 L/D section of screw 15 has a root diameter which increases uniformly from 1.76" to 2.16" and the third 7.5 L/D section of screw 15 has a root diameter of 2.16". In Zone B, screw 15 has a constant root diameter of 2.16". In Zone C, the first 7 L/D section of screw 15 has a root diameter of 2.25" and the final 10 L/D section of screw 15 has a root diameter of 2.00". Chamber 38 is approximately 17" in length and chamber 38a is approximately 25" in length.

Styrene homopolymer particles (approximately 20 mesh) that are admixed with 1% of finely-divided calcium silicate are fed into the extruder from hopper 11 at a rate of 117 lbs./hr. The melted styrene homopolymer as it passes 18 is at a temperature of about 390° F. and under a pressure of about 2200 p.s.i. In Zone B, pentane is injected into the melted styrene homopolymer at a pressure of about 3000 p.s.i. and at a rate of about 8 lbs./hr. When the styrene homopolymer enters Zone C its temperature is about 390° F. and its pressure is about 2200 p.s.i. The styrene homopolymer is maintained at a temperature of approximately 390° F. through the first 17" of Zone C by circulating hot oil through chamber 38 and is then cooled to a temperature of about 295° F. in the final 25" section of Zone C by circulating a coolant through chamber 38a. The pressure on the styrene homopolymer as it leaves Zone C is about 2500 p.s.i. The styrene homopolymer passes through a screen and breaker plate assembly not shown in FIG. 1 and enters die 40 at a pressure of about 1500 p.s.i. A blown foamed polystyrene film is obtained at a rate of about 125 lbs./hr. The film has a density of about 6 lbs./ft.³ and a majority of the cells thereof have a diameter of less than about 0.01".

Comparable results are obtained in the above example when the pentane foaming agent is replaced with, respectively, n-butane, dichlorodifluoromethane, or a pentane-liquid carbon dioxide (mixture in a 95/5 weight ratio).

EXAMPLE II

An unfoamed sheet of polystyrene having 5% of tris-(2,3 - dibromopropyl)phosphate incorporated therein is prepared employing an apparatus identical with that described in Example I except that (a) the blow film die is replaced with a sheet die of conventional construction and (b) in Zone A the screw is modified so that the first 7.5 L/D section of screw 15 has a root diameter of 1.90", the second 5 L/D section of screw 15 has a root diameter which uniformly increases from 1.90" to 2.30" and the third 7.5 L/D section of screw 15 has a root diameter of 2.30".

Styrene homopolymer particles (approximately 20 mesh) are fed into the extruder from hopper 11 at a rate of about 125 lbs./hr. The melted styrene homopolymer as it passes 18 is at a temperature of about 425° F. and under a pressure of about 2200 p.s.i. In Zone B, tris(2,3-dibromopropyl)phosphate is injected into the melted styrene homopolymer at a pressure of about 2800 p.s.i. and at a rate of about 6.3 lbs./hr. When the styrene homopolymer enters Zone C its temperature is about 425° F. and its pressure is about 2200 p.s.i. The styrene homopolymer is maintained at a temperature of approximately 425° F. throughout Zone C by circulating hot oil through chambers 38 and 38a. The ressure on the styrene homopolymer as it leaves Zone C is about 2500 p.s.i. The styrene homopolymer passes through a screen and breaker plate assembly not shown in FIG. 1 and enters the sheet die at a pressure of about 1500 p.s.i. A polystyrene sheet is obtained at a rate of about 130 lbs./hr. The tris(2,3-dibromopropyl)phosphate is uniformly dispersed throughout the polystyrene sheet.

The extrusion apparatus of the invention consists of an extruder (preferably a single screw extruder), which contains three separate functional zones or sections. The first or plasticating zone of the extruder melts and delivers the melted resin to the second zone at a high temperature and pressure. The structure and design of the screw in the first zone may take a wide variety of forms, but typically consists of a constant pitch screw which increases in root diameter in the downstream direction. Heating means are usually included in the first zone to assist in melting the resin. If desired, the first zone may consist of two elements, as for example by having a plasticating extruder arranged in tandem with the plasticating zone of a second extruder and delivering melted resin thereto.

The screw in the second zone may take a wide variety of forms, but usually is a constant pitch screw which has a constant root diameter. In addition, the root diameter in the second zone is usually either identical with or slightly smaller than the root diameter at the discharge end of the first zone. The second or injection zone is provided with specially designed means for injecting liquid substances into the melted resin. It is preferred to employ a pulrality of such injection means and to have them symmetrically disposed about the chamber wall. The injection means employed are capable of injecting the liquid into the extruder at a pressure substantially higher than the pressure of the melted resin, e.g., at a pressure of at least about 500 p.s.i. higher than the pressure of the melted resin. The injection means also include an element adapted to seal the liquid delivery orifice when liquid is not being injected into the melted resin. This feature prevents the melted resin from flowing into and plugging the orifice of the injection means. The sealing element preferably consists of (a) a discharge orifice whose feed inlet terminates in a valve face, (b) a cooperatively functioning valve which is adapted to seat against and seal the valve face of the orifice, (c) a first and fixed pressure means acting upon and urging the valve into seated relationship with the valve face, and (d) a second pressure means acting upon the valve and urging it out of seated relationship with the valve face; said second pressure means being responsive to and actuated by the pressure of the liquid within the injection means. To prevent melted resin from flowing into the injection means, the fixed pressure means urging the valve to seat against and seal the valve face should be preset to a pressure above that developed within the resin in the second zone of the extruder. The liquid injection means illustrated in FIGS. 1–2 represent the best means presently known for achieving this desirable combination of operational features.

The third zone of the extruder performs two functions. First, the pressure on the melted resin is increased to the level required to express the resin through the die. Second, the melted resin is cooled (or in some circumstances heated) to substantially the temperature at which it will leave the die. To properly cool (or heat) the resin, at least the aft section of the third zone should include external heat transfer means. Depending upon the length of the second zone of the extrusion apparatus, it is sometimes desirable to maintain the mixture of melted resin and liquid at a relatively high temperature in the fore section of the third zone. In this event, external heating means may be provided to heat the chamber wall of the fore section of the third zone. In addition, the root diameter of the screw may be increased in the fore section of the third zone so that frictional heat will be developed within the resin. In this event, however, the root diameter is preferably subsequently decreased in the aft section of the third zone.

The die affixed to the extrusion apparatus may be of any design presently used in extruding thermoplastic resins. Scores of suitable dies are known and reported in the art.

In carrying out the process of the invention the resin is heated to a high temperature and placed under substantial pressure in the first zone of the extruder. It is essential that the resin be heated to a high temperature so that it will have a relatively low viscosity as it enters the second zone. Preferably, the melted resin should be heated to a temperature at which it has a viscosity of less than about $1.5 \times 10^4$ poises and more especially less than about $6 \times 10^3$ poises. It is good practice to place the resin under substantial presure in the first zone. Typically, it is desirable to develop a pressure of the order of 1700–2700 p.s.i. on the resin in the first zone.

In the second zone of the extruder, the resin is normally maintained at substantially the maximum temperature that it attains in the first zone. If necessary, external heat may be supplied to the resin in the second zone to maintain it at this temperature. The liquid substance that is to be incorporated into the resin is injected into the melted resin at a pressure substantially higher than the pressure developed within the resin itself. Specifically, it is preferred to inject the liquid into the melted resin at a pressure at least about 500 p.s.i. and more especially at least about 1000 p.s.i. higher than the pressure of the melted resin. The use of such a high pressure insures that the liquid will be injected to a substantial depth in the melted resin. This in turn facilitates the attainment of a homogeneous dispersion of the liquid in the melted resin.

In the third zone of the extruder, the pressure on the melted resin will be increased to that required to express the resin through the die. Normally, this pressure will be at least of the order of about 2500 p.s.i. In addition, the melted resin will be cooled (or in rare cases heated) in at least the aft section of the third zone. The precise temperature to which the resin will be cooled (or heated) will depend upon a number of variables such as the nature of the resin being extruded, the nature and quantity of the liquid dispersed throughout the resin, etc. The selection of the proper discharge temperature is well within the knowledge and skill of those familiar with this art.

After leaving the third zone of the extruder, the homogeneous mixture of melted resin and liquid may be expresed through the die into any desired physical form such as a blown film, a sheet, etc. When a mixture of polystyrene and a hydrocarbon foaming agent is extruded as illustrated in the drawings, the extrusion temperature at the die should be about 285–315° F.

The thermoplastic resins which may be employed in the process of the present invention include cellulose ethers and esters, e.g., ethyl cellulose, cellulose acetate, cellulose acetate-butyrate; polycarbonates; polyamides; polyesters, polyformaldehyde; homopolymers and interpolymers of monomeric compounds containing the vinylidene grouping $CH_2=C<$ such as vinyl halides, e.g., vinyl chloride, vinyl bromide; vinylidene chloride; olefins, e.g., ethylene, propylene, isobutylene; vinyl esters of carboxylic acids, e.g., vinyl acetate, vinyl propionate, vinyl benzoate, vinyl ethers, e.g., vinyl methyl ether, vinyl isobutyl ether; unsaturated carboxylic acids and derivatives thereof, e.g., acrylic acid, methacrylic acid, acrylic acid and methacrylic acid esters of alcohols containing 1–18 carbon atoms, e.g., methyl and ethyl methacrylate, acrylamide, acrylonitrile; vinyl aromatic compounds, e.g., styrene, vinyl toluene, p-ethylstyrene, 2,4-dimethylstyrene, o-chlorostyrene, 2,5-dichlorostyrene, and vinyl naphthalene; and interpolymers of vinylidene monomers of the above type with alpha-beta-unsaturated polycarboxylic acdis and derivatives thereof, e.g., maleic anhydride, diethyl maleate, dibutyl fumarate, etc. It is feasible and sometimes desirable to employ blends of two or more thermoplastic resins, such as e.g., blends of polystyrene with rubbery diene polymers such as natural rubber, butadiene-styrene interpolymers, butadiene-acrylonitrile interpolymers and the like. Styrene graft copolymers prepared by polymerizing monomeric styrene, either alone or in admixture with other monomers such as acrylonitrile, in the presence of a rubbery diene polymer also may be employed advantageously. Especially suitable are styrene polymers having polymerized therein at least 50% by weight of styrene, e.g., styrene homopolymers and interpolymers of styrene with vinylidene monomers such as acrylonitrile, methyl methacrylate, alpha-methylstyrene, butadiene and the like.

Any desired liquid substance can be incorporated into the resin by the present invention. Low melting solids such as waxes and the like can, if desired, be melted and injected into a resin by the method of this invention. Liquified gases, e.g., those that can be liquified at temperatures above 0° C. under pressures of the order of 2000–3000 p.s.i. can also be used under proper conditions. The invention is particularly valuable, however, in incorporating a volatile liquid foaming agent into a thermoplastic resin.

The foaming agents which may be employed in the invention are volatile compounds which can be injected into the melted resin in the liquid state. Preferably, the foaming agents employed should be non-reactive organic compounds which have at most a slight solvent action on the thermoplastic resin and have atmospheric boiling points in the range of from about −10 to about 100° C. and more especially from about 10 to about 80° C. These include, for example, aliphatic hydrocarbons such as butane, pentane, isopentane, hexane, isohexane, cyclohexane, etc.; certain halogenated aliphatic hydrocarbons such as ethyl chloride, propyl chloride, isopropyl bromide, butyl chloride, and particularly perchlorofluorocarbons such as dichlorodifluoromethane, monochlorotrifluoromethane, trichloromonofluoromethane, 1,1,2,2-tetrachloro-1,2-difluoroethane, and the corresponding perchlorofluorocarbons set forth in U.S. 2,848,428 at column 3, lines 30–41; aliphatic amines such as ethylamine, propylamine, isopropylamine, dimethylamine, etc.; aliphatic ethers such as diethyl ethers, diisopropyl ether, methyl ethyl ether, ethyl isopropyl ether, etc.; acetaldehyde, etc. For a listing of other foaming agents that can be employed see U.S. 2,681,321. Mixtures of two or more such foaming agents can be employed. It has been observed that good results are obtained with mixtures of aliphatic hydrocarbons (as above described) and carbon dioxide. Typically such mixtures will contain 70–99.8 weight percent of the aliphatic hydrocarbon and correspondingly, 30–0.2 weight percent of carbon dioxide.

If desired, it is feasible to employ mixtures consisting predominantly of a foaming agent of the type described above with minor amounts of an organic compound having a solvent action on the thermoplastic resin. Typically, such mixtures will contain 70–98 weight percent of the foaming agent and, correspondingly, 30–2 weight percent of the organic compound having a solvent action on the thermoplastic resin. Typical of the organic compounds having a solvent action on the thermoplastic resin and which can be used are acetone, methylene chloride, styrene monomer, benzene, xylene, carbon tetrachloride, chloroform, etc. Preferably, the organic compound should have an atmospheric boiling point not higher than about 80° C.

When incorporating a liquid foaming agent into a thermoplastic resin by the process of this invention, it is desirable to admix with the resin a small quantity of a material which functions to reduce the pore size of the extruded foamed resin ultimately produced. Examples of materials which perform this function are finely-divided calcium silicate and certain hydrated salts as disclosed in U.S. 2,911,382.

Although the invention is primarily concerned with the preparation of extruded foamed thermoplastic resins, it can be readily adapted to prepare unfoamed, the foamable resin compositions. In this embodiment of the invention the homogeneous mixture of melted resin and liquid foaming agent is rapidly cooled immediately as it is discharged from the die. The step of cooling the resin as it leaves the die can be carried out in the manner disclosed in published Australian application 43,716/58. The resulting foamable resin compositions thus attained can be chopped into pellets for molding purposes and the like.

What is claimed is:

1. Method of producing a foamed thermoplastic product from a polymer selected from the class consisting of cellulose ethers, cellulose esters, polycarbonates, polyamides, polyesters, polyformaldehyde and homopolymers and interpolymers of monomeric compounds containing the vinylidene grouping $CH_2=C<$ and mixtures thereof, said method comprising: heat plasticizing and mixing said polymer and a cell-size control additive under pressure in the absence of blowing agents to form a heat plasticized mixture thereof; feeding said mixture under pressure to an injection zone; injecting at least one liquid substance selected from the group consisting of dichlorodifluoro methane, monochlorotrifluoromethane and substances boiling in the range of from about −10° C. to about 100° C. at one atmosphere pressure into said mixture; thereafter increasing the pressure while subjecting the mixture to a forwarding mixing action and regulating its temperature with heat transfer means; thereafter subjecting the mixture to a forwarding mixing action while cooling the mixture to a temperature at which it is flowable but below the boiling point of said liquid substance at the pressure of said mixture thereby preventing foaming inside the extruded while simultaneously maintaining the fluidity of the mixture; thereafter increasing the pressure of said mixture while continuing to cool; and thereafter continuously extruding the mixture into a zone of considerably lower pressure to cause said liquid substance to volatilize and thus expand said mixture.

2. The method of claim 1 wherein the polymer is a compound from the class consisting of monovinyl aromatic compounds and their halogenated derivatives.

3. The method of claim 1 wherein the polymer is polystyrene.

4. The method of claim 1 wherein the step of regulating the temperature of the mixture with heat transfer means comprises heating the mixture.

5. The method of claim 1 wherein the step of regulating the temperature of the mixture with heat transfer means comprises cooling the mixture.

6. The method of claim 1 wherein the mixtuer is decompressed while the liquid substance is being injected.

7. Method of producing a foamed thermoplastic product from a polymer of a compound from the class consisting of monovinyl aromatic compounds and their halogenated derivatives, comprising, heat plasticizing and mixing said polymer and a cell-size control additive under pressure in the absence of blowing agents to form a heat plasticized mixture thereof; feeding said mixture under pressure to an injection zone; decompression said mixture and injecting a low boiling normally liquid substance, boiling between 80° F. and 200° F. into said mixture; thereafter increasing the pressure and heating said mixture while subjecting it to a forwarding mixing action; thereafter subjecting the mixture to a forwarding mixing action while cooling the mixture to a temperature at which it is flowable but below the boiling point of the low boiling normally liquid substance at the pressure of said mixture; thereafter increasing the pressure of said mixture while continuing to cool; and thereafter continuously extruding the mixture into a zone of considerably lower pressure to cause the low boiling normally liquid substance to volatilize and thus expand said mixture.

References Cited
UNITED STATES PATENTS

| | | | |
|---|---|---|---|
| 2,848,739 | 8/1958 | Henning | 264—53 |
| 2,928,130 | 3/1960 | Gray | 264—50 |
| 2,987,774 | 6/1961 | Jacobson | 264—53 |
| 3,151,192 | 9/1964 | Jacobs et al. | 264—53 |
| 3,160,688 | 12/1964 | Aykanian et al. | 264—53 |

PHILIP E. ANDERSON, Primary Examiner

U.S. Cl. X.R.

18—5 P, 12 SN; 260—2.5 E; 264—176 R